United States Patent

[11] 3,532,035

[72] Inventors: Tadayoshi Fujii,
Mikio Naya, Toyokawa-shi, Japan
[21] Appl. No.: 681,798
[22] Filed: Nov. 9, 1967
[45] Patented: Oct. 6, 1970
[73] Assignee: Minolta Camera Kabushiki Kaisha
Osaka, Japan
[32] Priority: Dec. 24, 1966
[33] Japan
[31] 41/84,320

[54] PHOTOELECTRIC PHOTOMETER
8 Claims, 13 Drawing Figs.

[52] U.S. Cl. .................................................. 95/10,
95/64, 250/204, 356/231
[51] Int. Cl. ..................................................... G01j 1/16,
G03b 7/02

[50] Field of Search .................................... 95/10C, 64;
356/222, 224, 225, 227, 229, 231, 233; 352/141;
250/204, 205, 217

[56] References Cited
UNITED STATES PATENTS
3,062,092  11/1962  Schmidt ..................... 356/226
3,187,652  6/1965   Kinnard ..................... 95/10(C)UX Primary Examiner—Norton Ansher
Assistant Examiner—Joseph F. Peters, Jr.
Attorney—Waters, Roditi, Schwartz and Nissen ABSTRACT: A photoelectric photometer usable for independent or built-in exposure meters, of a brightness visually comparing type without using any conventional ammeter having a delicate pointer mechanism. The light from the outside is converted into the luminosity of an electric lamp with which the luminosity of a standard lamp is visually compared.

Patented Oct. 6, 1970 3,532,035
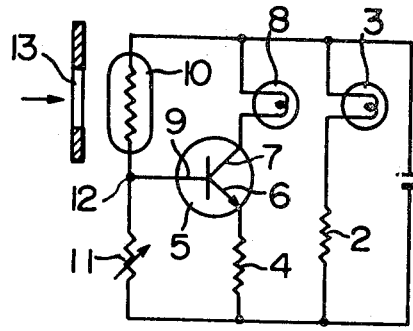
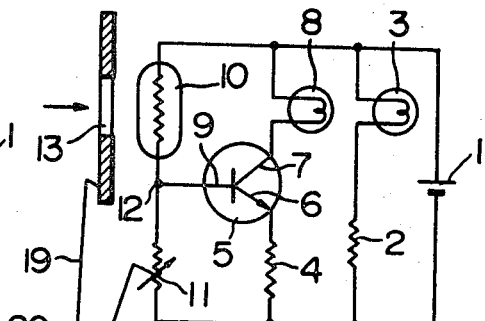
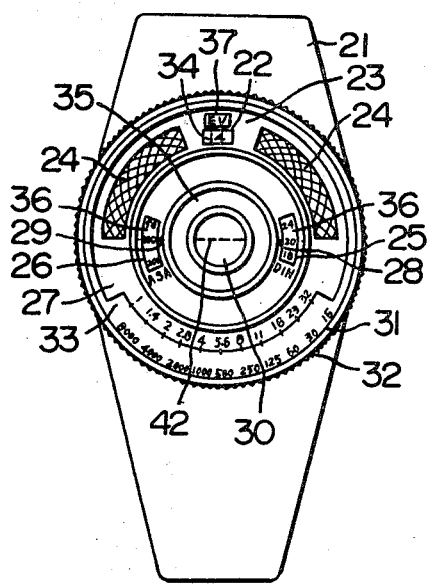
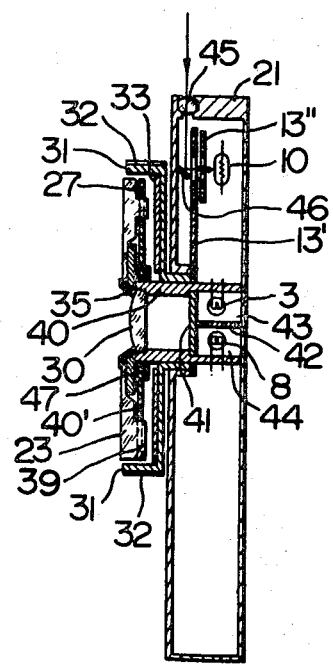

PHOTOELECTRIC PHOTOMETER

BACKGROUND OF THE INVENTION

This invention relates to photoelectric photometers such as independent or built-in exposure meters for use with still cameras, movie cameras or the like.

Conventionally there are known some systems of photometers of this kind, such as a system in which the light from an object to be taken by a camera is compared with an artificial light source whose luminosity can be varied, and the brightness of the object is judged from the variation value of luminosity of the artificial light source when the luminosities of the two are matched with each other; and a modification in which the incident light to be compared with an artificial light source of a predetermined luminosity is adjusted to be matched with the luminosity of the artificial light, and the brightness of the object is determined from the degree of the adjustment of the incident light. In each system, the exposure meter can be combined with a camera by associating an iris device of the camera with the above-mentioned adjustment mechanism of the exposure meter.

Also, there is known a system in which the light from the object is led into a photoelectric element such as a photocell, a CdS element, or a photo transistor, for inducing the variation thereof, and the photo-current (or photo-resistance) is detected either by direct measurement or by zero method, for controlling an exposure determining element of a camera (for example, the shutter speed or the degree of aperture of the iris).

SUMMARY OF THE INVENTION

The above-mentioned conventional systems are deficient in that they provide a measurement value of low accuracy since the matching of the luminosities by visual or other means is very difficult since there is a difference in color temperature between the natural light incident from the object and the artificial light source to be compared with the natural light. On the other hand, the latter system also has faults in shock-proofing, in durability and in cost, since it must utilize an electrical meter which is weak in precision.

In both systems, there is another fault that an error due to the variation of source voltage cannot be avoided.

The present invention aims to eliminate the above faults, and has for its object to provide a photoelectric photometer comprising a first electric lamp the luminosity of which is determined as a function of a source voltage, and a second similar electric lamp the luminosity of which is determined as a function of the intensity of the light received from an object to be photographed and of said source voltage, the luminosities of the first and second electric lamps being compared and matched with each other by adjusting appropriate adjusting means such as a variable resistance acting as a means for determining the base voltage of a transistor arranged in the photometer circuit, or a means for regulating the incident light to a photoelectric element, which are combined with a control means such as a scale plate of an illuminometer, an exposure calculator (or scale dial), the shutter speed and/or the aperture of the iris, or a programmed combination thereof for controlling the exposure of a camera, thereby determining the luminosity of the object.

According to the present invention, measurements of high accuracy can be performed since the error due to the variation of the source voltage is eliminated and since the luminosities are compared between two electric lamps having the same color temperature. Furthermore, the photometer of this invention is excellent in shock-proof performance and durability.

BRIEF DESCRIPTION OF THE DRAWING

FIG. 1 is a circuit diagram showing the principle of the photoelectric photometer of the present invention. FIG. 2 is a diagram showing a combination of the photometer with an exposure controlling member of a camera. FIG. 3 is a front view of an embodiment of an exposure meter utilized in the photoelectric system of this invention. FIG. 4 is a vertical section thereof.

DESCRIPTION OF THE PREFERRED EMBODIMENTS

Figure 5:
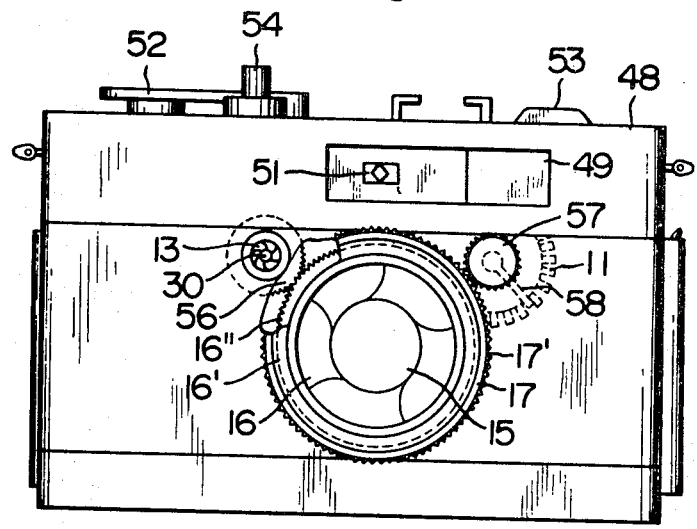
FIG. 5 is a front view, partly cut away, of another embodiment wherein a photoelectric photometer of this invention is built in a camera for associating it with an exposure controlling means of the camera.

As shown in FIG. 1, a first electric lamp 3 is connected to an electric source 1 through a fixed resistance 2, and a second electric lamp 8 is connected, in parallel with the first electric lamp 3, to the electric source 1 through a collector 7 of a transistor 5 the emitter 6 of which is connected to the negative terminal of the electric source 1 through a resistance 4. To the electric source 1, there is also connected in parallel a photoelectric element 10 such as a CdS element and a series variable resistance 11. The connecting point thereof is led to a base 9 of the transistor 5. The reference numeral 13 designates means, such as an iris, for regulating the incident light coming from an article to be measured. Although details are not shown, it will be of course clear that photoelectric element 10 is shielded from the external light other than that coming through the aperture of the iris.

When the photometer is directed towards an object to be measured, the resistance value of the photoelectric element will be determined in accordance with the luminosity of the object, and the potential of the point 12 will be determined in accordance with the resistance ratio between the photoelectric element and the variable resistance 11. Since the base voltage of the transistor is thus determined, electric current will flow in the collector circuit under the control of the base voltage, and illuminate the second electric lamp 8. If the source voltage is maintained constant and the variable resistance 11 is also maintained at a given value, the second electric lamp 8 will be therefore lighted with a certain luminosity which is determined as a function of the brightness of the object to be measured. The second electric lamp 8 therefore has different luminosity from that of the first electric lamp 3 which is lighted normally through the fixed resistance 2.

When the resistance value of the variable resistance 11 is changed from the above condition, the potential of the point 12 and therefore the base voltage of the transistor 5 will be changed. Accordingly, the collector current will be changed for varying the luminosity of the second electric lamp 8. If the resistance value of the variable resistance 11 is changed to visually match the luminosity of the second electric lamp 8 with that of the first electric lamp 3, the brightness of the object to be measured can be determined from the resistance value of the variable resistance 11.

Such a matching of the luminosities can also be performed by utilizing the aperture variation of the iris 13, fixing the value of the resistance 11. The brightness of the object to be measured can thus be determined from the opening degree of the aperture, or in other words, from the adjusted value of the means for regulating the incident light.

Furthermore, the brightness of the object can be determined from the degree of aperture of the iris 13 and also from the resistance value of the variable resistance 11, when the matching is obtained by adjusting both elements.

FIGS. 3 and 4 are respectively a front view and a vertical section of an independent exposure meter embodying the above-mentioned principle of the present invention. As is clear from these figures, a circular projection is formed at the front face of a casing 21. The circular projection forms an exposure scale dial. The scale dial is covered by a transparent cover 23 which is rotatably mounted on a shaft 40 by a central ring 35 for allowing its rotation by the manipulation of sliding aids 24. The shaft 40 is intergral with the casing 21. Under the cover 23, there are provided projections 38 and 39 which are fitted into a cutout for a shutter speed window of a film sensitivity scale plate 27 and into a cutout for an EV value indicating window 22, respectively.

An EV value index 37 is marked on the film sensitivity scale plate 27 just to be located at the outer side of the EV value indicating window. Also there is provided an f number indication in the lower part of the scale plate 27 opposed to a shutter speed indication.

Under the ring 35, there is arranged an extension 40' of the fixed shaft 40 which carries ASA and DIN film sensitivity indicating windows 25 and 26 and their indexes 28 and 29 at the respective outer sides of the ring 35. The film sensitivity can thus be selected by the indication of the indexes 28 and 29 for the film sensitivity scale in the windows 25 and 26 when the scale plate is rotated.

At the center of the exposure scale dial, there is a circular window for comparing the luminosities of two electric lamps 3 and 8. The window has a lens for effectively leading the light from the inside and a light-diffusing plate 41 for equalizing the nonuniform light from the filament of an electric lamp in order to facilitate the comparison of the luminosities of the two lamps 3 and 8. By the provision of a central partition 42, two lamp chambers are formed for illuminating the respective parts of the diffusing plate 41 by the lamps.

In the outer periphery of the exposure scale dial, a rotatable ring 31 is fitted in such a manner that its inner periphery is rotatably mounted around the shaft 40. The rotatable ring 31 has a disc portion shown as a shutter speed scale plate 33 having a shutter speed scale and an EV value scale 34. The rotatable ring 31 is fixed by connecting it to a light quantity restricting plate 13' at the inside of the casing 21 for allowing the simultaneous rotation thereof. The light quantity restricting plate 13' controls the external light coming into a photoelectric element 10 through a lens 45, a mirror 46, and an aperture mask 13". Thus the restricting plate 13' and mesh 13" successively vary the quantity of incoming light.

On the shaft 40, a ring is fixed for separating the rotatable ring 31 and the cover 23 with the film sensitivity scale plate 27 so as to prevent any rotation of the cover 23 and scale plate 27 when the ring 31 is rotated.

By the above-mentioned construction, the angular positions of the f number indicating window and the EV value indicating window 22 can be determined when a desired film sensitivity is selected, and the EV value for an object to be measured is shown in the indicating window 22 by rotating the rotatable ring 31 so as to equalize the luminosity of the second electric lamp 8 governed by the brightness of the external light to the luminosity of the first electric lamp 3. Since the shutter speed scale plate 33 is associated with the rotatable ring 31, the suitable relationship between the f number and the shutter speed will therefore be shown in the lower part of the circular projection, and also the EV value will be shown in the window 22.

FIG. 2 shows a mechanism of a built-in exposure meter which is contained in a casing of a camera and associated with an exposure controlling mechanism of the camera. In this figure, there are shown a lens 15, an iris 16, a shutter 17, a photosensitive material 18, of the camera. As shown, the light coming from an object reaches the photosensitive material 18 through the lens 15, iris 16, and shutter 17. A photoelectric photometer shown in FIG. 1 is built in the camera as mentioned in the above, and the direction of the light coming to the photoelectric element 10 through the iris 13 of the photometer is made parallel to the light axis of the camera. Under these conditions, the variable resistance 11 is set to a predetermined value and the iris 13 of the meter and the iris 16 of the camera are associated with each other by a suitable associating device 19. By matching or equalizing the luminosities of the electric lamps with each other, the aperture of the iris 16 of the camera whose shutter speed is preferentially chosen, can be automatically selected.

If the variable resistance 11 is associated with the shutter speed regulating apparatus (not shown) of the shutter 17, the shutter speed can be determined in response to the operation of the exposure meter, preferentially selecting the aperture of the iris 16.

Furthermore, by associating the iris 13 with the iris 16 and the variable resistance 11 with the shutter speed regulating apparatus, it is possible to control both the iris aperture and the shutter speed in associated relation with the exposure meter.

Figure 6:
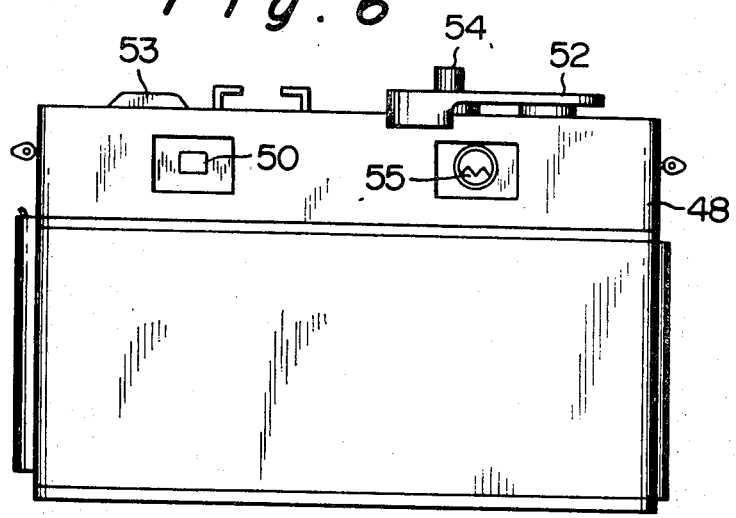
FIG. 6 is a back view thereof.

In FIGS. 5 and 6, an actual embodiment of such exposure meter built in a camera is shown for the purpose of illustration. FIG. 5 is a front view of the embodiment and FIG. 6 is its back view. As shown in FIG. 5 a lens cylinder mounted on a camera casing 48 for a lens 15 has aperture defining membranes 16 which are regulated by a regulation ring 16' of the iris apparatus, and a shutter speed regulation ring, as well as a focus regulating ring. A gear 16" is integrally and coaxially arranged on the iris regulation ring 16' and is meshed with a gear 56 which is integral with the iris 13 of the photoelectric element 10 for controlling the aperture of the iris 13 in relation to the aperture of the iris apparatus 16 of the camera. Teeth 17' formed around the shutter speed regulation ring 17 are meshed with a thick gear 57 mounted on a shaft which is forwardly projecting from a camera casing 48. A brush 58 mounted on the shaft is so arranged to slide on a sliding variable resistance 11 in the casing. Furthermore, the camera comprises a finder object lens 49, a range finder window 51, a film winding shaft 52, a film re-winding shaft 53, and a shutter button 54.

On the back of the camera, there is provided a window 55 opposite a finder window 50. An opal glass is fitted within the window 55 and divided into two parts at its center by an M-shaped or saw-tooth line as shown in FIG. 6. The two divided parts are respectively illuminated by the first and second electric lamps 3 and 8. Accordingly, when the luminosities of the two parts are matched with each other by the regulation of the iris regulation ring 16' and the shutter speed regulation ring 17, the most appropriate conditions can be determined in accordance with the brightness of the object.

Figure 7A:
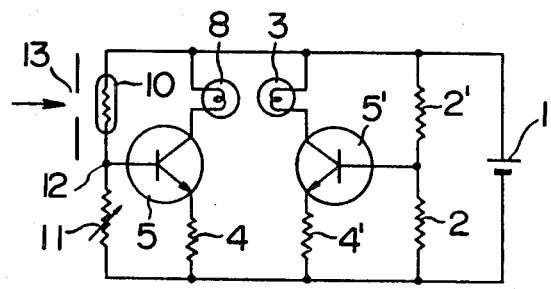
FIGS. 7a, 7b, 7c, 7d, 7e, 7f and 7g show various modifications of the photometer circuit of this invention.
Figure 7B:
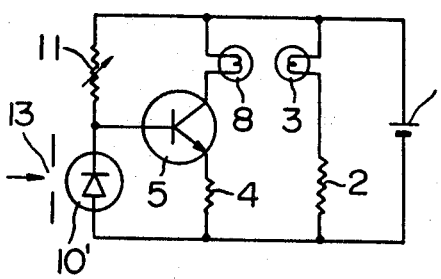
Figure 7C:
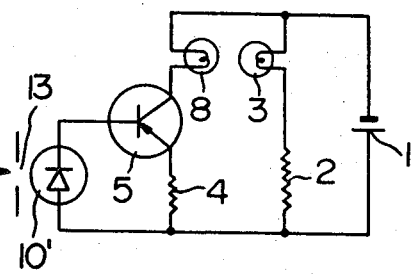
Figure 7D:
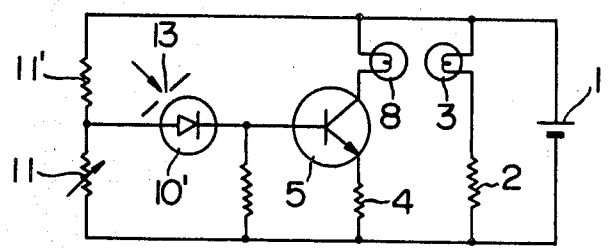
Figure 7E:
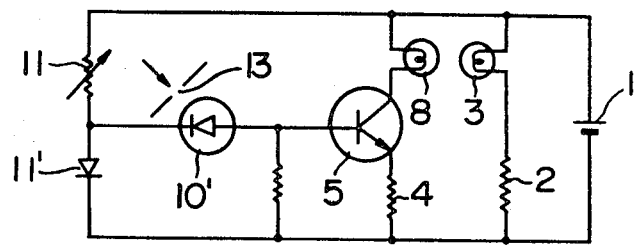
Figure 7F:
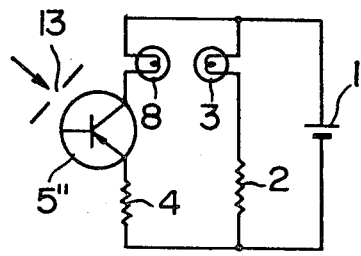

FIGS. 7a and 7b show modifications of the control circuit, FIGS. 7b, 7d and 7e are circuit diagrams for modifications in which photo electromotive force elements such as selenium photocells or silicon photocells are used as the photoelectric elements, and FIG. 7f is a circuit diagram of a further modification in which a photo transistor 5" is used.

In general, the luminosity of an electric lamp varies in proportion to the third power of the voltage variation. In the present invention, the primary error of the source voltage variation due to such relationship can be prevented since the luminosities of the both lamps change in the same manner. Although in the circuit shown in FIG. 1 the source voltage variation brings a secondary error to the transistor 5, such secondary error can be compensated by way of controlling the first electric lamp 3 through a transistor 5' as shown in FIG. 7a. Furthermore, the temperature characteristic error of the transistor can be corrected by such arrangement.

Figure 7G:
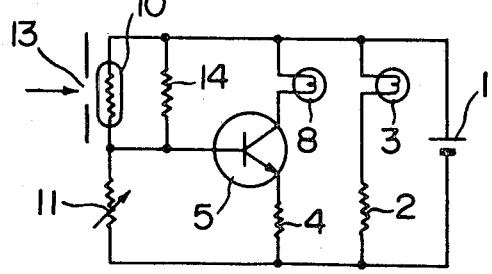

By arranging a resistance 14 in parallel with the photoelectric element 10 as shown in FIG. 7g, the inclination of the apparent luminosity-resistance characteristic curve of the photoelectric element 10 becomes gentle and the current range within which the matching of the luminosities of the electric lamps 3 and 8, or in other words, the range within which the difference in luminosity could not be distinguished, becomes broader, thereby lowering the detecting ability of the meter. In this case it is however possible to measure the brightness of a darker object.

The modification shown in FIG. 7d has resistances 11 and 11' for applying a bias voltage to the base of the transistor 5, thereby broadening the operation range of the photoelectric motive force element 10'.

The modification shown in FIG. 7e has a diode 11' which has the same temperature characteristics as that of the photoelectric motive force element 10' for compensating the temperature error.

As mentioned in the above, the matching between the two electric lamps are mainly dependent on the human eye. It is well known that the human eye has excellent ability to compare the luminosities of two objects, although the absolute value thereof cannot be detected. For this reason, this invention has a high accuracy, despite the fact that the matching is performed visually. The accuracy becomes especially high when the color temperature of the two light sources are materially the same.

According to this invention, the provision of any meter scale in relation to the matching of the luminosity of two electric lamps is a problem of free choice. At any rate, the resistance value of the photoelectic element 10 can be determined linearly, and therefore the utilization of the characteristics of the element has a very simple relation. Accordingly there is no need to take into consideration the inclination of the luminosity-resistance characteristic curve which is important for the conventional exposure meter. Strictly speaking, it is true that the inclination of the luminosity-resistance characteristics contributes to the increase or decrease of the allowable range (allowance range). However, such is nothing but a secondary error, and this minor error does not substantially influence the measurement in comparison with the detecting ability by the luminosity comparison, when the present invention is utilized as an exposure meter for usual purposes. Accordingly, the present invention has advantages that the precision of the parts can be lowered, the meter is suitable for mass-production, and the cost therefor can be lowered.

We claim:

1. A photoelectric photometer comprising an electric source, a first lamp connected to said electric source, a photoelectric converting element and a variable resistance series connected with each other and connected in parallel to said electric source, a transistor having a base connected between said photoelectric converting element and said variable resistance, a second lamp connected to the collector circuit of said transistor and having a characteristic the same as that of said first lamp, and an exposure determining means, the luminosity of said second lamp being determined by the light quantity from an object, which impinges against said photoelectric converting element, and by said variable resistance, as a function of the voltage of said electric source, the luminosity of said second lamp being compared with that of said first lamp determined solely as a function of said electric source, said exposure determining means being adjusted to align the luminosities of both lamps.

2. A photoelectric photometer as claimed in claim 1 comprising means for regulating the incident light quantity at the incident light side of said photoelectric converting element, and a further exposure determining means coupled to the latter said means.

3. A photoelectric photometer as claimed in claim 1 wherein said photoelectric converting element is a photoelectric cell.

4. A photoelectric photometer as claimed in claim 1 wherein said photoelectric converting element is a photo-electromotive force element.

5. A photoelectric photometer as claimed in claim 1 wherein said photoelectric converting element is a photo transistor.

6. A photoelectric photometer as claimed in claim 2 wherein one of the two exposure determining means is related to shutter speed, and the other to film sensitivity.

7. A photoelectric photometer as claimed in claim 2 wherein one of the two exposure determining means is related with iris opening, and the other with film sensitivity.

8. A photoelectric photometer as claimed in claim 2 wherein both said exposure determining means are related with exposure control means of a camera.